(12) United States Patent
Akiba (10) Patent No.: US 11,428,046 B2
(45) Date of Patent: Aug. 30, 2022

(54) BRAKING DEVICE FOR AUTOMATIC WINDING TYPE SCREEN DEVICE

(71) Applicant: TOK, INC., Tokyo (JP)

(72) Inventor: Junichiro Akiba, Tokyo (JP)

(73) Assignee: TOK, Inc., Tokyo (JP)

( * ) Notice: Subject to any disclaimer, the term of this patent is extended or adjusted under 35 U.S.C. 154(b) by 371 days.

(21) Appl. No.: 16/639,058

(22) PCT Filed: Sep. 6, 2017

(86) PCT No.: PCT/JP2017/032023
§ 371 (c)(1),
(2) Date: Feb. 13, 2020

(87) PCT Pub. No.: WO2019/049223
PCT Pub. Date: Mar. 14, 2019

(65) Prior Publication Data
US 2020/0362630 A1    Nov. 19, 2020

(51) Int. Cl.
*E06B 9/56* (2006.01)
*E06B 9/82* (2006.01)
(Continued)

(52) U.S. Cl.
CPC .............. *E06B 9/82* (2013.01); *E06B 9/42* (2013.01); *E06B 9/54* (2013.01); *F16D 59/00* (2013.01);
(Continued)

(58) Field of Classification Search
CPC ..... E06B 9/42; E06B 9/56; E06B 9/80; E06B 9/82; E06B 9/204; E06B 9/304; E06B 9/322
(Continued)

(56) References Cited

U.S. PATENT DOCUMENTS 10,294,719 B2 * 5/2019 Yamagishi .............. E06B 9/322
11,078,996 B2 * 8/2021 Momose ............. F16H 25/2021
(Continued)

FOREIGN PATENT DOCUMENTS

JP    2004124649    4/2004
JP    2004238827    8/2004
(Continued)

OTHER PUBLICATIONS

International Search Report for corresponding International Application No. PCT/JP2017/032023, dated Dec. 5, 2017; 1 page.

*Primary Examiner* — Christopher P Schwartz
(74) *Attorney, Agent, or Firm* — Fattibene and Fattibene LLC; Paul A. Fattibene (57) ABSTRACT

A braking device for an automatic winding type screen device that stably brakes the automatic winding of a screen regardless of the temperature. The braking device comprises: a housing that is provided inside a winding shaft so as to be able to turn with the winding shaft to wind up a screen; a sleeve that is inserted into the housing and is mounted to a bracket so as not to be able to turn; and a mobile element that can rotate with the housing. A first spring and a second spring are provided on the outer side of the sleeve so as to have the mobile element therebetween. The mobile element twists forward on the sleeve along with rotation of the housing, and biasing forces of the first spring and the second spring that expand and contact with the forward twist of the mobile element brakes the rotation of the winding shaft.

6 Claims, 10 Drawing Sheets

(51) Int. Cl.
*E06B 9/42* (2006.01)
*E06B 9/54* (2006.01)
*F16D 59/00* (2006.01)
E06B 9/80 (2006.01)
F16D 121/14 (2012.01)
F16D 125/40 (2012.01)

(52) U.S. Cl.
CPC ... *E06B 2009/543* (2013.01); *E06B 2009/807* (2013.01); *F16D 2121/14* (2013.01); *F16D 2125/40* (2013.01)

(58) Field of Classification Search
USPC ......... 160/291, 295, 296; 188/129, 130, 134
See application file for complete search history.

(56) References Cited

U.S. PATENT DOCUMENTS

2004/0261958 A1* 12/2004 Sugiyama ................. E06B 9/54
160/296
2021/0087880 A1* 3/2021 Taubenrauch ............ E06B 9/42

FOREIGN PATENT DOCUMENTS

| JP | 2004346707 | 12/2004 |
|---|---|---|
| JP | 2007303111 | 11/2007 |
| JP | 3141738 U | 5/2008 |

* cited by examiner

BRAKING DEVICE FOR AUTOMATIC WINDING TYPE SCREEN DEVICE

TECHNICAL FIELD

The present invention relates to a braking device used in an automatic winding type screen device which automatically winds a screen with a coil spring built in a winding shaft and, more particularly, to a braking device for an automatic winding type screen device which can maintain braking force regardless of a variation in temperature.

BACKGROUND ART

In the past, an automatic winding type screen device which is openably/closably attached to an opening such as an entrance or a window of a building for insect proof, dust proof, light shielding is known. Patent Literature 1 discloses an automatic winding type screen device which winds a screen with rotational biasing force obtained by torsion of a coil spring built in a winding shaft and suppresses an excessive increase of a winding speed of a screen with an oil damper.

CONVENTIONAL ART LITERATURE

Patent Literature

Patent Literature 1: Japanese Published Unexamined Application No. 2004-346707

SUMMARY OF THE INVENTION

Problem to be Solved by the Invention

However, the automatic winding type screen device described in Patent Literature 1 includes an oil damper having a high temperature dependence. Since braking force of the oil damper varies when oil used in the oil damper extends or contracts due to a variation in temperature, when the braking force of the oil damper is excessive, the screen is hard to be entirely winded. When the braking force of the oil damper excessively small, impact occurring in a screen winding state may not be moderated disadvantageously.

Extension and contraction of the oil damper repeated depending on a variation in temperature cause oil to leak out of the damper, and the oil damper cannot deliver predetermined performance for a long period of time disadvantageously.

Thus, a technical problem to be solved to stably brake automatic braking of a screen regardless of a temperature has been posed, and the present invention has as its object to solve the problem.

Means for Solving the Problem

The present invention has been proposed to achieve the above object, an invention described in an embodiment provides a braking device for an automatic winding type screen device in which a winding shaft is disposed on the upper, left, or right side of an opening of a building, an end of a screen is windably fixed to the winding shaft, and a coil spring biasing the winding shaft in a winding direction is internally fitted in the winding shaft, including a housing internally fitted in the winding shaft rotatably together with the winding shaft and formed in a cylindrical shape, a sleeve fixed in the housing without being rotatable and threaded in the outer periphery thereof, a mover screwed with the sleeve and being rotatable together with the housing, and a first spring and a second spring loosely fitted on the sleeve and disposed on both sides of the mover, respectively, wherein the mover screws in the housing in accordance with the rotation of the housing in a longitudinal direction of the sleeve, and biasing forces of the first spring and the second spring extending and contacting in accordance with screwing of the mover brake the rotation of the winding shaft.

According to the configuration, the housing and the mover rotate together with the winding shaft, and the mover screws on the sleeve to extend and contract the first spring and the second spring to cause a biasing force depending on the expansion/contraction of the first spring and the second spring to act on the mover so as to prevent the mover from screwing. A braking torque caused by the biasing forces of the first spring and the second spring act on the rotating shaft through the mover, so that the screen can be braked.

Since the braking device is configured without being charged with oil, a fluctuation in braking performance caused by a variation in temperature is suppressed, and the screen can be stably braked for a long period of time.

An invention described in claim 2 another embodiment, in addition to the configuration of the invention described in a previous embodiment, provides a braking device for an automatic winding type screen device wherein an adjuster screwed at an arbitrary position of the sleeve, and, depending on an attached position of the adjuster, an initial extension/contraction range of the first spring or the second spring interposed between the adjuster and the mover can be arbitrarily adjusted.

According to the configuration, since the initial extension/contraction range of the first spring and the second spring interposed between the adjuster and the mover can be adjusted, a braking torque can be arbitrarily increased or decreased.

An invention described in another embodiment, in addition to the configuration of the invention described in previous embodiments, provides a braking device for an automatic winding type screen device wherein a biasing force of the second spring brakes rotation of the winding shaft in a closing operation of the screen is set to be greater than a biasing force of the first spring braking the rotation of the winding shaft in an opening operation of the screen.

According to the configuration, since the braking torques of the first spring and the second spring act more strongly in the closing operation of the screen than in the opening operation, the opening operation of the screen can be smoothly performed, and impact occurring when the screen is automatically winded can be moderated.

An invention described in another embodiment, in addition to the configuration of the invention described in previous embodiments, provides a braking device for an automatic winding type screen device wherein the housing and the mover are concave-convex-engaged with each other, and the mover is housed in the housing rotationally together with the housing.

According to the configuration, the housing and the mover are firmly engaged with each other, and the biasing forces of the first spring and the second spring reliably act on the mover rotating together with the housing, so that the screen can be stably braked.

An invention described in another embodiment, in addition to the configuration of the invention described in previous embodiments, provides a braking device for an automatic winding type screen device wherein at least one of the first spring and the second spring is loosely fitted on the sleeve, convex-concave-engaged with the housing, and held between sliding plates which can be rotated together with the housing.

According to the configuration, since at least one of the first spring and the second spring is held between the sliding plates to stably extend/contract the first spring and the second spring, the screen can be stably braked.

An invention described in another embodiment, in addition to the configuration of the invention described in previous embodiments, provides a braking device for an automatic winding type screen device wherein the housing is fixed to an end part of the coil spring.

According to the configuration, when the coil spring and the housing are directly coupled to each other, another member coupling the coil spring and the winding shaft to each other need not be prepared to make it possible to reduce the number of parts.

Advantages

According to the present invention, the housing and the mover rotate together with the winding shaft, and the mover screws on the sleeve to extent and contract the first spring and the second spring, so that a biasing force depending on the extension/contraction of the first spring and the second spring acts on the mover to prevent screwing of the mover. Since a braking torque caused by the biasing forces of the first spring and the second spring acts on the rotating shaft through the mover, the screen can be braked. In addition, since the braking device is configured to be oil-free, a fluctuation in braking performance caused by a variation in temperature is suppressed, and the screen can be stably braked for a long period of time.

BRIEF DESCRIPTION OF THE DRAWINGS

FIGS. 1A and 1B are diagrams showing an automatic winding type screen device to which a braking device according to an embodiment of the present invention is applied, in which

FIGS. 2A and 2B are diagrams showing a braking device, in which

FIGS. 3A to 3C are sectional views showing the braking device in FIG. 2, in which

FIGS. 4A to 4D are diagrams showing a housing, in which

FIGS. 5A to 5D are diagrams showing a sleeve, in which

FIGS. 6A and 6B are diagrams showing a mover, in which

FIGS. 7A and 7B are diagrams showing an adjuster, in which

FIGS. 8A and 8B are diagrams showing a sliding plate, in which

FIGS. 9A to 9E are diagrams showing a cap, in which

MODES FOR CARRYING OUT THE INVENTION

The present invention is achieved by providing a braking device for a automatic winding type screen device in which, in order to stably brake automatic winding of a screen regardless of a temperature, a winding shaft is disposed on any one of upper, left, or right side of an opening of a building, an end part of the screen is windably fixed to the winding shaft, and a coil spring biasing the winding shaft in a winding direction is internally fitted in the winding shaft, includes a housing internally fitted in the winding shaft rotatably together with the winding shaft and formed in a cylindrical shape, a sleeve fixed in the housing without being rotatable and threaded in the outer periphery thereof, a mover screwed with the sleeve and being rotatable together with the housing, and a first spring and a second spring loosely fitted on the sleeve and disposed on both sides of the mover, respectively, wherein the mover screws in the housing in accordance with the rotation of the housing in a longitudinal direction of the sleeve, and biasing forces of the first spring and the second spring extending and contacting in accordance with screwing of the mover brakes the rotation of the winding shaft.

Embodiment

An automatic winding type screen device 1 to which a braking device 10 according to an embodiment of the present invention is applied will be described below with reference to the accompanying drawings. In the following embodiment, when the numbers, numerical values, quantities, ranges, and the like of constituent elements are mentioned, unless otherwise specified or except that the numbers are limited to theoretically clear numbers, the numbers are not specific numbers and may be larger or less than the specific numbers.

When the shapes and positional relationships of the constituent elements are mentioned, unless otherwise specified or unless it is obviously not possible in principle, the shapes and the like substantially include approximate or similar ones or the like.

In the drawings, a characteristic part may be exaggerated by enlargement or the like to make the characteristic feature understandable, the sizes, proportions, and the like of the constituent elements are not always the same as the actual ones.

Figure 1A:
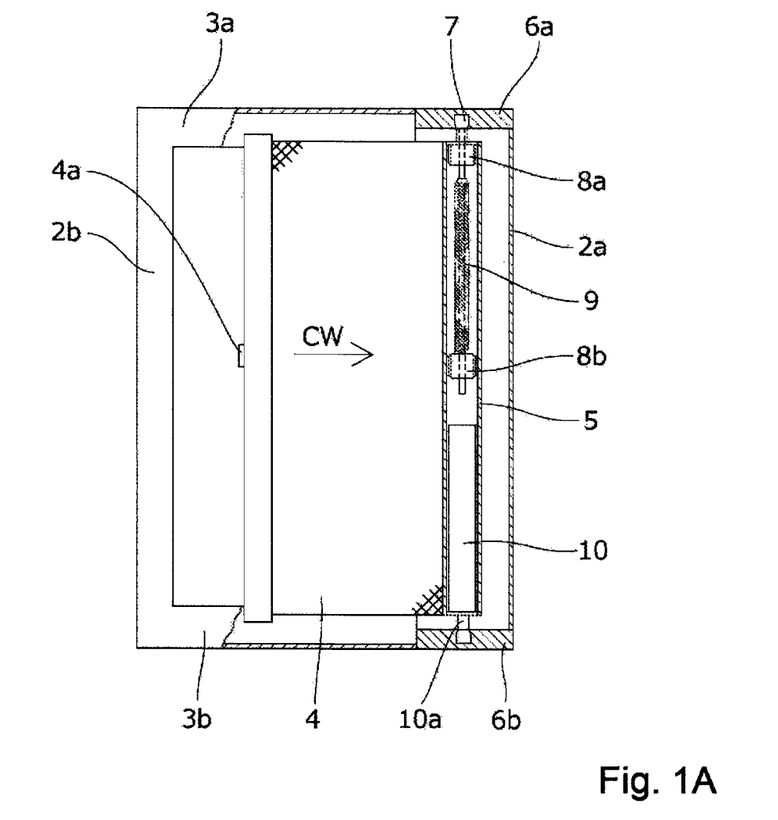
FIG. 1A is a partially cutaway front view and FIG. 1B is a lateral sectional view.
Figure 1B:
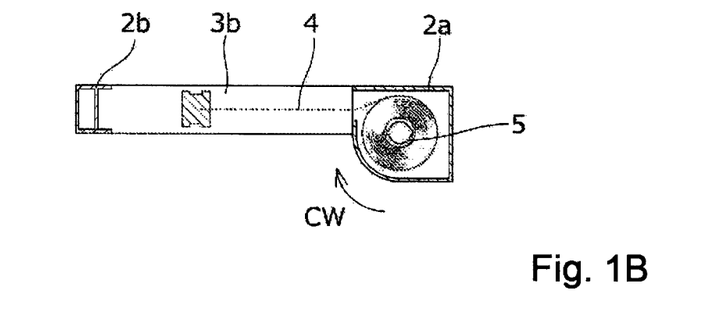

FIGS. 1A and 1B are diagrams showing a automatic winding type screen device 1, in which FIG. 1A is a partially cutaway front view and FIG. 1B is a lateral sectional view.

The automatic winding type screen device 1 is installed at an opening of a building such as an entrance of a house for light shielding, heat shielding, insect proof, dust proof, and the like. The automatic winding type screen device 1 of a horizontal type in which a screen is opened/closed in the horizontal direction will be exemplified below. However, the automatic winding type screen device 1 may be of a vertical type in which a screen is opened/closed in the vertical direction.

The automatic winding type screen device 1 includes one pair of left and right longitudinal frames 2a and 2b and one pair of upper and lower transversal frames 3a and 3b. The longitudinal frames 2a and 2b and the transversal frames 3a and 3b are coupled to each other. The upper and lower ends of a screen 4 of a screen window or the like are guided to the transversal frames 3a and 3b.

The longitudinal frame 2a supports a rotatable winding shaft 5 on which the screen 4 is winded. Into the winding shaft 5, a fixed shaft 7 having an upper end fixed to a bracket 6a disposed at an upper part is inserted. The winding shaft 5 is supported by support members 8a and 8b rotatably attached to the fixed shaft 7.

A coil spring 9 built in the winding shaft 5 has an upper end fixed to the fixed shaft 7 and a lower end fixed to the support member 8b. More specifically, the winding shaft 5 is connected to the fixed shaft 7 through the coil spring 9. Note that reference numeral 4a in FIG. 1A denotes a lock preventing the screen 4 from being carelessly closed.

The braking device 10 is built in the lower end of the winding shaft 5, and is rotatably attached to the first shaft 10a and attached to the winding shaft 5 without being rotatable. The fixed shaft 10a is fixed to a bracket 6b.

Figure 2A:
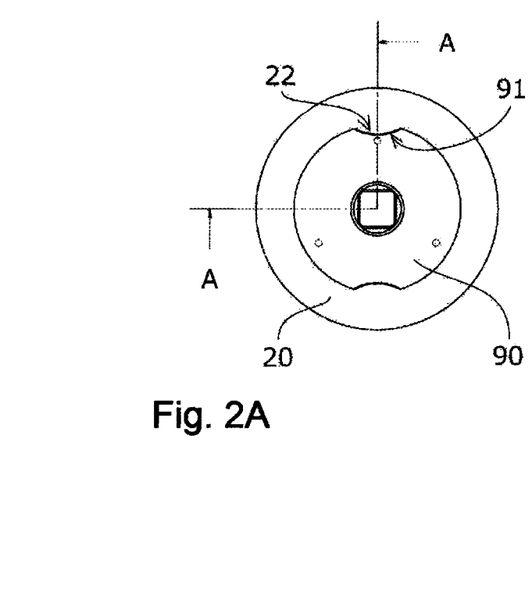
FIG. 2A is a front view and FIG. 2B is a sectional view along an A-A line.
Figure 2B:
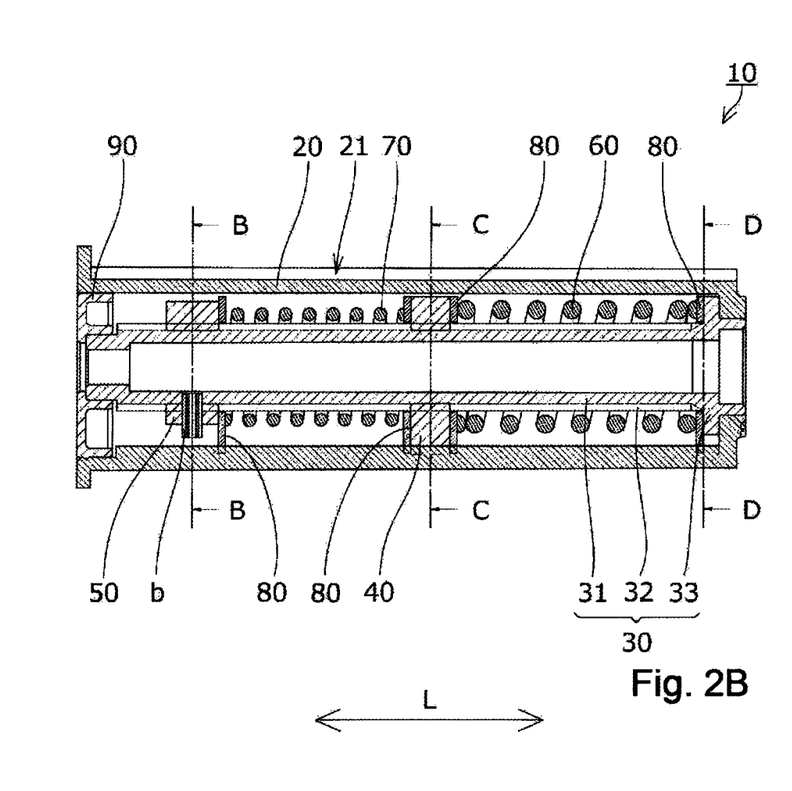
Figure 3A:
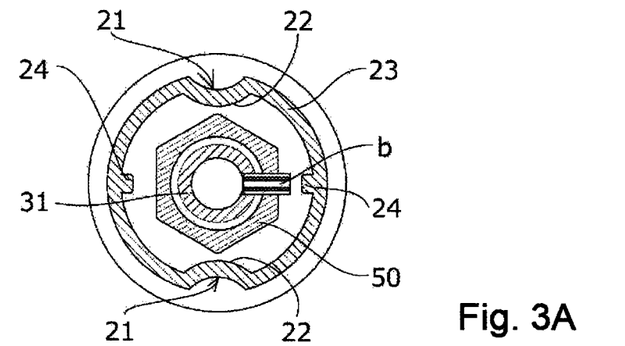
FIG. 3A is a sectional view along a B-B line.
Figure 3B:
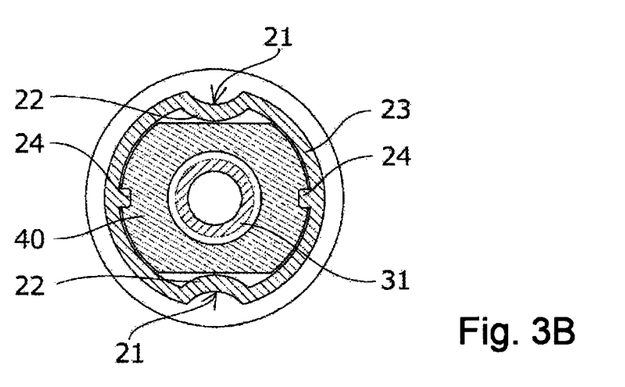
FIG. 3B is a sectional view along a C-C line.
Figure 3C:
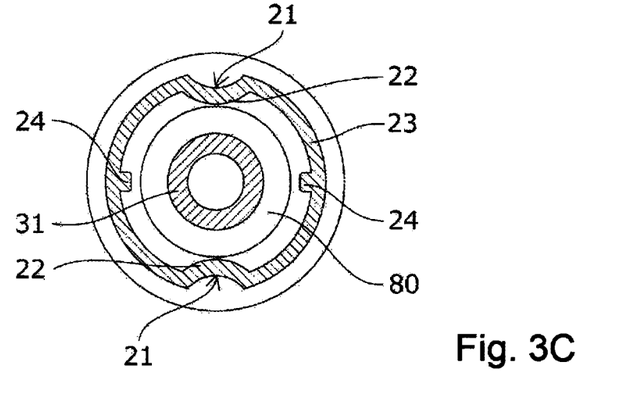
FIG. 3C is a sectional view along a D-D line.

The basic structure of the braking device 10 will be described below with reference to the accompanying drawings. FIGS. 2A and 2B are diagrams showing the braking device 10, in which FIG. 2A is a front view and FIG. 2B is a sectional view along an A-A line. FIGS. 3A to 3C are sectional views showing the braking device 10, in which FIG. 3A is a sectional view along a B-B line, FIG. 3B is a sectional view along a C-C line, and FIG. 3C is a sectional view along a D-D line.

The braking device 10 includes a housing 20 formed in a substantially cylindrical shape. On the outer periphery of the housing 20, a concave part 21 formed along a longitudinal direction L is formed. The concave part 21 can be engaged with a convex part (not shown) formed on the inner periphery of the winding shaft 5. In this manner, the housing 20 is fitted in the winding shaft 5 without being rotatable.

Into the housing 20, a sleeve 30 formed in a substantially cylindrical shape having a diameter smaller than that of the housing 20 is inserted. In the outer periphery of a shaft part 31 of the sleeve 30, a screw part 32 is formed.

A mover 40 and an adjuster 50 are screwed in the sleeve 30. The mover 40 is disposed near the center of the shaft part 31, and the adjuster 50 is disposed on a distal end side of the shaft part 31. The adjuster 50 is fixed to the sleeve through a bolt b.

A first spring 60 is disposed between a flange part 33 disposed on a proximal end side of the sleeve 30 and the mover 40. A second spring 70 is disposed between the mover 40 and the adjuster 50.

A sliding plate 80 is disposed at both the ends of the first spring 60 and both the ends of the second spring 70. More specifically, the sliding plate 80 is interposed between the flange part 33 and the first spring 60, between the mover 40 and the first spring 60, between the mover 40 and the second spring 70, and between the adjuster 50 and the second spring 70.

A cap 90 is disposed at the distal end of the sleeve 30. In the cap 90, a concave part 91 formed along a longitudinal direction L is formed. The concave part 91 is engaged with a first convex part 22 formed on the inner periphery of the housing 20. In this manner, the cap 90 is attached to the housing 20 without being rotatable.

Figure 4A:
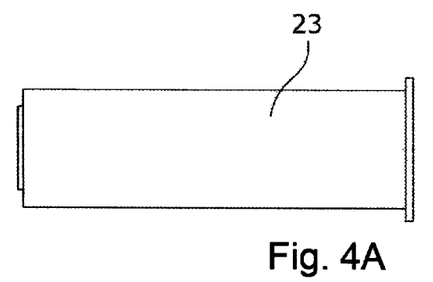
FIG. 4A is a front view.
Figure 4B:
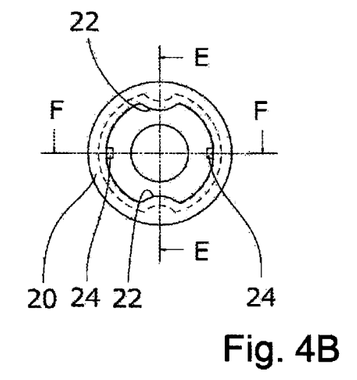
FIG. 4B is a right side view.
Figure 4C:
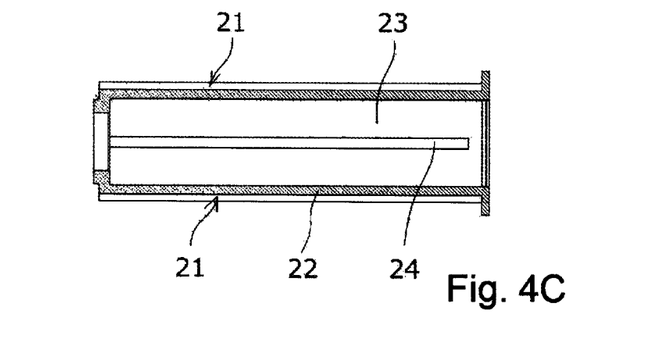
FIG. 4C is a sectional view along an E-E line.
Figure 4D:
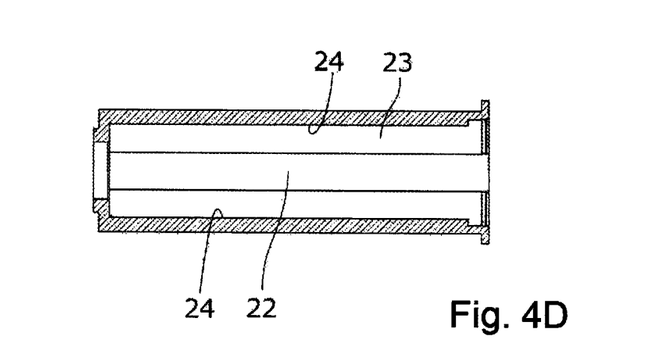
FIG. 4D is a sectional view along an F-F line.

Constituent parts of the braking device 10 will be described below in detail. FIGS. 4A to 4D are diagrams showing a housing 20, in which FIG. 4A is a front view, FIG. 4B is a right side view, FIG. 4C is a sectional view along an E-E line, and FIG. 4D is a sectional view along an F-F line.

Figure 5A:
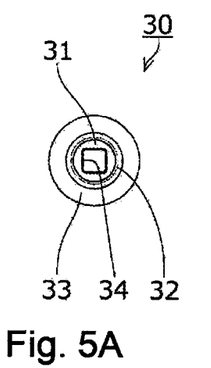
FIG. 5A is a left side view.
Figure 5B:
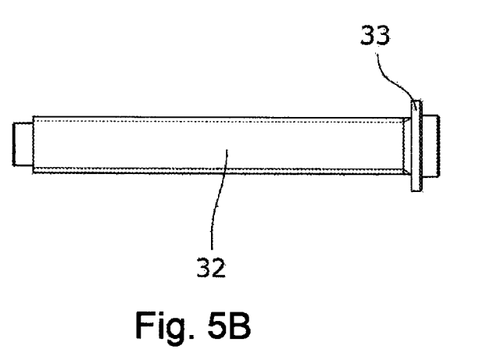
FIG. 5B is a front view.
Figure 5C:
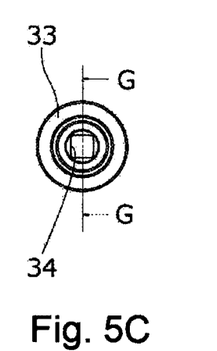
FIG. 5C is a right side view.
Figure 5D:
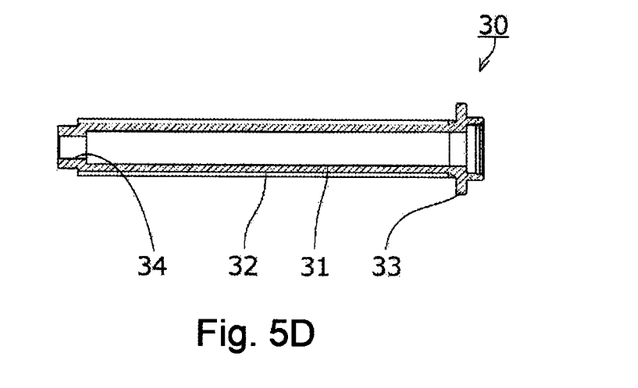
FIG. 5D is a sectional view along a G-G line.
Figure 6A:
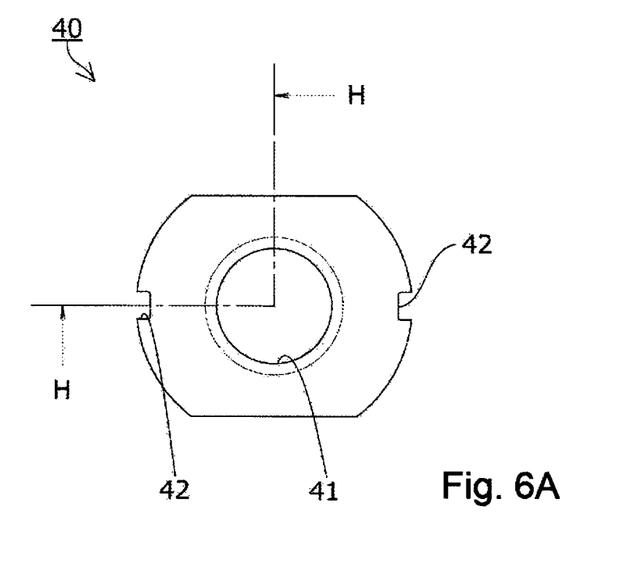
FIG. 6A is a plan view and FIG. 6B is a sectional view along an H-H line.
Figure 6B:
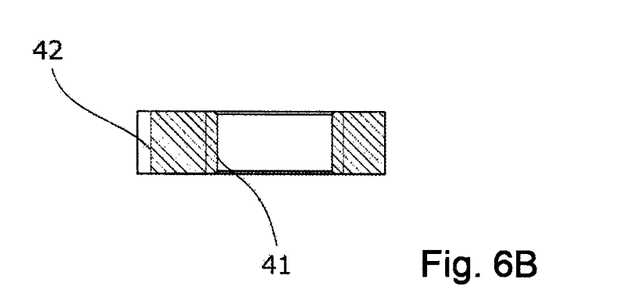
Figure 7A:
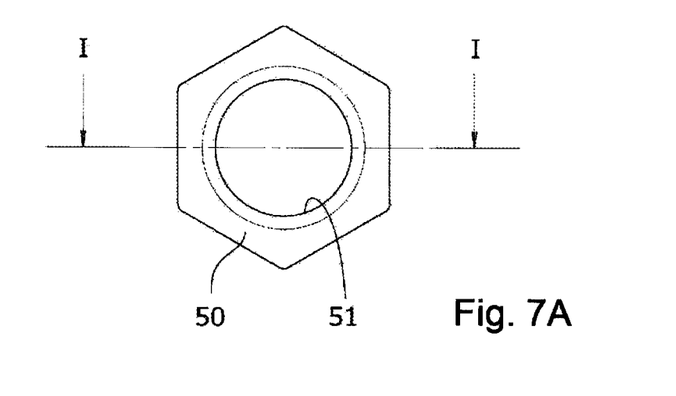
FIG. 7A is a plan view and FIG. 7B is a sectional view along an I-I line.
Figure 7B:
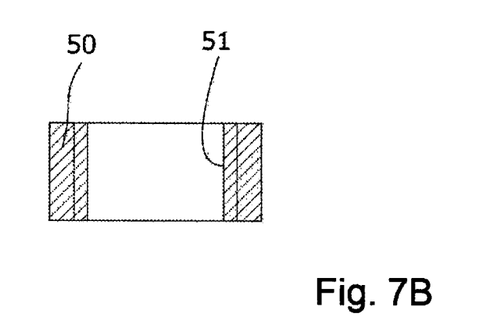
Figure 8A:
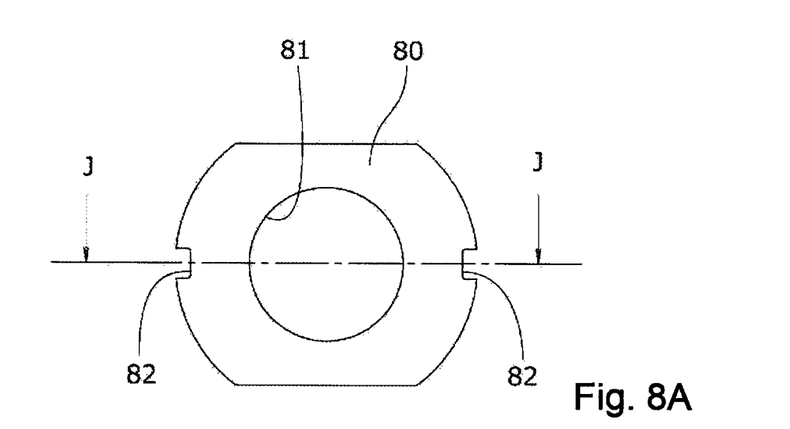
FIG. 8A is a plan view and FIG. 8B is a sectional view along a J-J line.
Figure 8B:
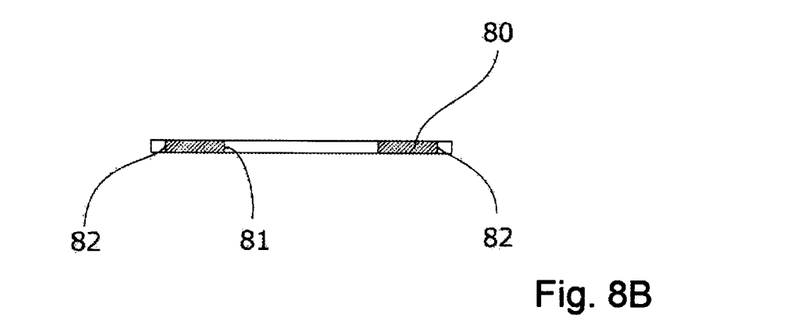
Figure 9A:
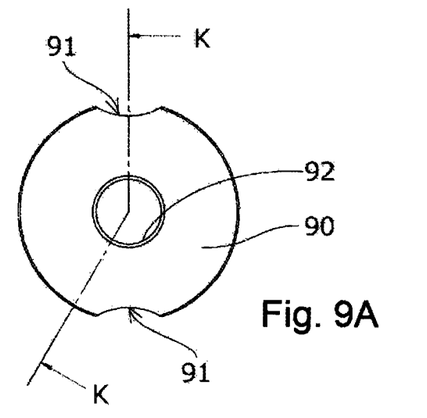
FIG. 9A is a plan view.
Figure 9B:
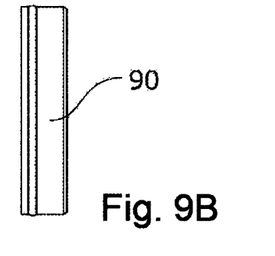
FIG. 9B is a right side view.
Figure 9C:
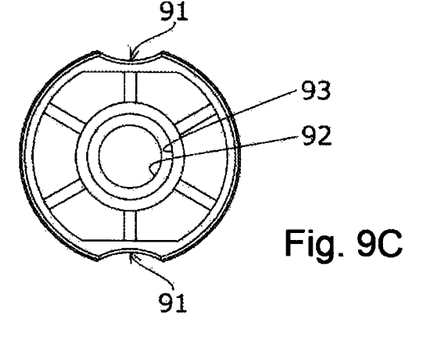
FIG. 9C is a bottom view.
Figure 9D:
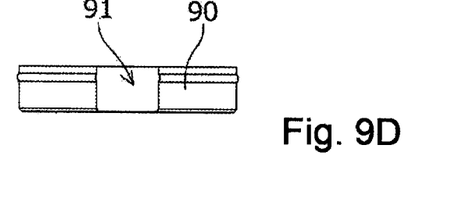
FIG. 9D is a front view.
Figure 9E:
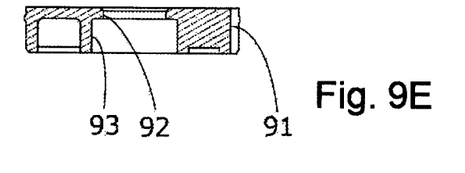
FIG. 9E is a sectional view along a K-K line.

FIGS. 5A to 5D are diagrams showing the sleeve 30, in which FIG. 5A is a left side view, FIG. 5B is a front view, FIG. 5C is a right side view, and FIG. 5D is a sectional view along a G-G line. FIGS. 6A and 6B are diagrams showing the mover 40, in which FIG. 6A is a plan view and FIG. 6B is a sectional view along an H-H line. FIGS. 7A and 7B are diagrams showing the adjuster 50, in which FIG. 7A is a plan view and FIG. 7B is a sectional view along an I-I line. FIGS. 8A and 8B are diagrams showing the sliding plate 80, in which FIG. 8A is a plan view and FIG. 8B is a sectional view along a J-J line. FIGS. 9A to 9E are diagrams showing the cap 90, in which FIG. 9A is a plan view, FIG. 9B is a right side view, FIG. 9C is a bottom view, FIG. 9D is a front view, and FIG. 9E is a sectional view along a K-K line.

As shown in FIG. 4, the housing 20 is formed in a substantially cylindrical shape having openings at both the ends thereof. The first convex parts 22 of the housing 20 are formed by expanding from a main part 23 to the inner periphery side, and are disposed inside the main part 23 to vertically face each other. One pair of second convex parts 24 convexly formed from the main part 23 to the inner peripheral side are disposed inside the main part 23 to horizontally face each other. The first convex part 22 and the second convex part 24 are arranged to be dephased by 90 degrees when viewed from the side surface. The lower end of the coil spring 9 may be fixed to the outer periphery of the housing 20 without being connected to the support member 8b.

As shown in FIGS. 5A to 5D, a rectangular through hole 34 is formed in the distal end of the sleeve 30. The fixed shaft 10a having a rectangular section can be inserted into the through hole 34. When the fixed shaft 10a is inserted into the through hole 34, the sleeve 30 is fixed to the bracket 6b without being rotatable. The pitch of the screw part 32 of the sleeve 30 corresponds to a screwing amount (sliding amount) obtained when the mover 40 rotates once relatively to the sleeve 30.

As shown in FIGS. 6A and 6B, the mover 40 is formed in a substantially elliptical shape when planarly viewed not to be in contact with the first convex part 22 when the mover 40 is assembled in the housing 20. At the center of the mover 40, a screw hole 41 is formed and can be screwed with the screw part 32.

In the mover 40, two slits 42 obtained by partially cutting the outer periphery out are formed. When the slits 42 is engaged with the second convex parts 24, the mover 40 is connected to the housing 20 without being rotatable. An attachment position of the mover 40 on the sleeve 30 can be arbitrarily changed depending on a desired initial extension/contraction range of the first spring 60.

As shown in FIGS. 7A and 7B, the adjuster 50 is formed in a hexagonal shape when planarly viewed. A screw hole 51 is formed at the center of the adjuster 50, and can be screwed with the screw part 32. An attachment position of the adjuster 50 on the sleeve 30 can be arbitrarily changed depending on a desired initial extension/contraction range of the second spring 70.

As shown in FIGS. 8A and 8B, the sliding plate 80 is formed in a substantially elliptical shape when planarly viewed not to be in contact with the convex part 22 when the sliding plate 80 is assembled in the housing 20. A through hole 81 is formed in the center of the sliding plate 80 and can be loosely fitted on the shaft part 31.

In the sliding plate 80, two slits 82 obtained by cutting the outer periphery out are formed. When the slits 82 are engaged with the second convex 24, the sliding plate 80 is connected to the housing 20 without being rotatable.

A front surface 83 and a rear surface 84 of the sliding plate 80 are brought into contact with the flange part 33, the mover 40, the adjuster 50, the first spring 60, or the second spring 70. In this manner, the first spring 60 or the second spring 70 held between the sliding plates 80 is suppressed from idling with reference to the mover 40.

As shown in FIGS. 9A to 9E, the cap 90 is formed in a substantially disk-like shape when planarly viewed. A through hole 92 into which a fixed shaft 10b can be inserted is formed in the center of the cap 90. A housing concave part 93 is inserted into the through hole 92, and the distal end of the sleeve 30 is fitted in the housing concave part 93.

Figure 10:
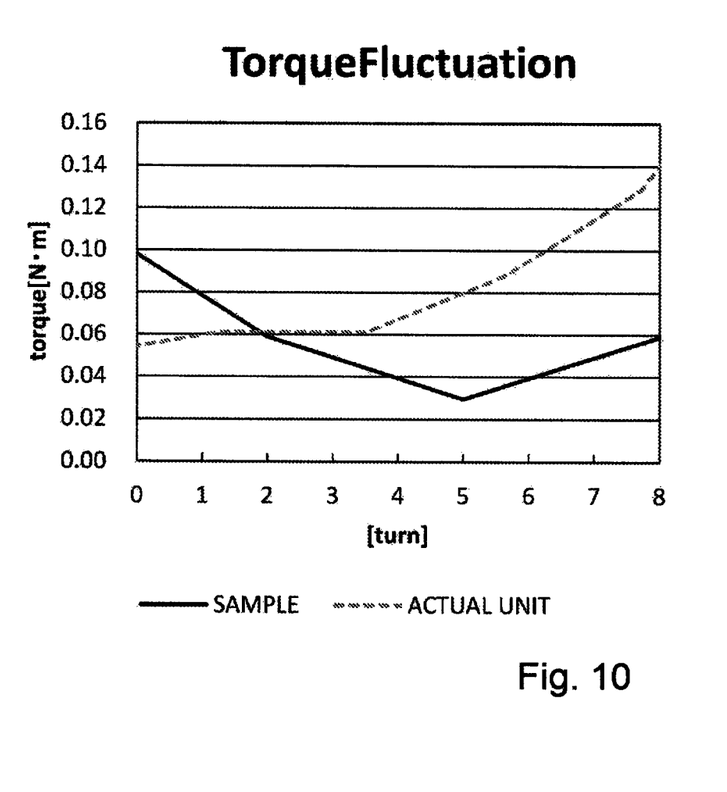
FIG. 10 is a graph showing a magnitude relation between torques of a coil spring and a braking device.

An operation of the braking device will be described below with reference to the accompanying drawings. FIG. 10 is a graph showing a magnitude relation between torques of the coil spring 9 and the braking device 10.

When the screen 4 is manually closed, the winding shaft 5 and the housing 20 counterclockwise rotate in FIG. 1B, and the coil spring 9 is twisted by the number of rotations of the winding shaft 5. On the other hand, the mover 40 screws on the sleeve 30 in a direction in which the first spring 60 is contracted to generate biasing forces of the first spring 60 and the second spring 70. More specifically, a biasing force in a compression direction generated by contraction of the first spring 60 and a biasing force in a tensile direction generated by extension of the second spring 70 act on the mover 40. In addition, the winding shaft 5 rotates against the biasing force of the coil spring 9.

When the lock 4a of the screen 4 is released, the winding shaft 5 and the housing 20 rotated in a direction (clockwise in FIG. 1B) in which the screen 4 opens, and the mover 40 screws on the sleeve 30 in a direction in which the second spring 70 is contracted. A biasing force in a tensile direction generated by extension of the first spring 60 and a biasing force in a compression direction generated by contraction of the second spring 70 act on the mover 40. The torsion of the coil spring 9 is returned by the number of rotations of the winding shaft 5.

A relationship between a torque (to be referred to as a "braking torque" hereinafter) depending on the biasing forces of the first spring 60 and the second spring 70 and a torque (to be referred to as a "winding torque" hereinafter) depending on the torsion of the coil spring 9 will be described below. A "SAMPLE" in FIG. 10 denotes a braking torque, and an "ACTUAL UNIT" denotes a winding torque. An abscissa indicates the number of rotations of the winding shaft 5, "0" indicates a state in which the screen 4 is entirely winded, and "8" indicates a state in which the screen 4 is entirely dragged out.

As shown in FIG. 10, the winding torque increases in proportion to the number of rotations of the winding shaft 5.

On the other hand, a braking torque is minimum when the winding shaft 5 is rotated, and is maximum when the screen 4 is winded up (the number of rotations of the winding shaft 5 is zero). The range of 0 to 2 as which are the numbers of rotations is a range in which the biasing force of the second spring 70 strongly acts, and the range of 2 to 8 which are the numbers of rotations in FIG. 10 is a range in which the biasing force of the first spring 60 strongly acts. This is because the spring constant (spring characteristics) of the second spring is set to be larger than the spring constant (characteristics) of the first spring 60. For example, the spring constant of the first spring 60 is set to, for example, 5.38 N/m, and the spring constant of the second spring 70 is set to, for example, 8.88 N/m. A curve indicating the biasing torque can be arbitrarily changed by changing the shapes, diameters, and the like of the first spring 60 and the second spring 70.

Since the relationship between the winding torque and the braking torque causes the braking torque to gradually decrease when the screen 4 is gradually closed in a full open state, a closing operation of the screen 4 is smoothly performed without stress. On the other hand, when the screen 4 is automatically winded in a full closed state, at the opening (for example, the numbers of rotations of the winding shaft 5 are 3 to 8), the winding operation of the screen 4 is quickly performed, and, in the closing stage (for example, the numbers of rotations of the winding shaft 5 are 0 to 2), the braking torque exceeds the winding torque, and the winding operation of the screen 4 is slowly performed.

In this manner, in the braking device 10 of the automatic winding type screen device 1 according to the present invention, the housing 20 and the mover 40 rotate together with the winding shaft 5, and the mover 40 screws on the sleeve 30 to extend/contract the first spring 60 and the second spring 70, so that the biasing forces depending on the extension/contraction of the first spring 60 and the second spring 70 act on the mover 40 to prevent the mover 40 from screwing, and the braking torque acts on the winding shaft 5 through the mover 40. For this reason, the screen 4 can be braked. In addition, since the braking device 10 is configured to be oil-free, a fluctuation in braking performance caused by a variation in temperature is suppressed, and the screen can be stably braked for a long period of time.

The present invention can be variously modified without departing from the spirit and scope of the present invention, and the present invention includes the modified invention as a matter of course.

INDUSTRIAL APPLICABILITY

The present invention can be applied to not only a winding type screen door but also a roll curtain, a shutter device, or the like.

REFERENCE NUMERALS 1 automatic winding type screen device
2a, 2b longitudinal frame
3a, 3b transversal frame
4 screen
5 winding shaft
6a, 6b bracket
7 fixed shaft
8a, 8b support member
9 coil spring
10 braking device
10a fixed shaft
20 housing
21 concave part (of housing)
22 first convex part
23 main part
24 second convex part
30 sleeve
31 shaft part
32 screw part
33 flange part
34 through hole
40 mover
41 screw hole (of mover)
42 slit (of mover)
50 adjuster 51 screw hole (of adjuster)
60 first spring
70 second spring
80 sliding plate
81 through hole (of sliding plate)
82 slit (of sliding plate)
83 front surface
84 rear surface
90 cap
91 concave part (of cap)
92 through hole (of cap)
93 housing concave part

What is claimed is:

1. A braking device for an automatic winding type screen device in which a winding shaft is disposed on the upper, left, or right side of an opening of a building, an end of a screen is windably fixed to the winding shaft, and a coil spring biasing the winding shaft in a winding direction is internally fitted in the winding shaft, comprising:
   a housing internally fitted in the winding shaft rotatably together with the winding shaft and formed in a cylindrical shape,
   a sleeve fixed in the housing without being rotatable and threaded in the outer periphery thereof,
   a mover screwed with the sleeve and being rotatable together with the housing, and
   a first spring and a second spring loosely fitted on the sleeve and disposed on both sides of the mover, respectively, wherein
   the mover screws in the housing in accordance with the rotation of the housing in a longitudinal direction of the sleeve, and
   biasing forces of the first spring and the second spring extending and contracting in accordance with screwing of the mover to brake the rotation of the winding shaft.

2. The braking device for an automatic winding type screen device according to claim 1, wherein
   an adjuster screwed at an arbitrary position of the sleeve, and,
   depending on an attached position of the adjuster, an initial extension/contraction range of the first spring or the second spring interposed between the adjuster and the mover can be arbitrarily adjusted.

3. The braking device for an automatic winding type screen device according to claim 1, wherein
   a biasing force of the second spring brakes rotation of the winding shaft in a closing operation of the screen is set to be greater than a biasing force of the first spring braking the rotation of the winding shaft in an opening operation of the screen.

4. The braking device for an automatic winding type screen device according to any one of claim 1, wherein
   the housing and the mover are concave-convex-engaged with each other, and the mover is housed in the housing rotationally together with the housing.

5. The braking device for an automatic winding type screen device according to any one of claim 1, wherein
   at least one of the first spring and the second spring is loosely fitted on the sleeve, convex-concave-engaged with the housing, and held between sliding plates which can be rotated together with the housing.

6. The braking device for an automatic winding type screen device according to any one of claim 1, wherein
   the housing is fixed to an end part of the coil spring.

* * * * *